(12) United States Patent
Cruz

(10) Patent No.: US 6,907,678 B2
(45) Date of Patent: Jun. 21, 2005

(54) PORTABLE ELECTRIC HAIR DRYER AND MOUNT THEREFOR

(75) Inventor: Anthony V. Cruz, Westlake Village, CA (US)

(73) Assignee: Hamilton Beach/Proctor-Silex, Inc., Glen Allen, VA (US)

(*) Notice: Subject to any disclaimer, the term of this patent is extended or adjusted under 35 U.S.C. 154(b) by 304 days.

(21) Appl. No.: 09/435,507

(22) Filed: Nov. 8, 1999

(65) Prior Publication Data

US 2002/0043003 A1 Apr. 18, 2002

(51) Int. Cl.[7] ............................................. F26B 19/00
(52) U.S. Cl. ......................................................... 34/97
(58) Field of Search ......................... 34/96, 97, 98, 34/99, 100; 392/380, 384, 381, 382; 320/115

(56) References Cited

U.S. PATENT DOCUMENTS

| | | |
|---|---|---|
| 1,918,803 A | 7/1933 | Floraday |
| 3,293,528 A | 12/1966 | Rosen et al. |
| 3,964,708 A | 6/1976 | Reeves |
| D274,153 S | 6/1984 | Nagelkerke |
| 4,493,975 A | 1/1985 | Yamamoto |
| D280,851 S * | 10/1985 | Muller et al. ................ D28/12 |
| D286,209 S | 10/1986 | Camens |
| D286,924 S | 11/1986 | Muller |
| 4,659,907 A | 4/1987 | Andis et al. |
| 4,683,369 A | 7/1987 | Rieckman et al. |
| 4,767,914 A | 8/1988 | Glucksman |
| 4,802,287 A | 2/1989 | Chen |
| 4,904,847 A | 2/1990 | Kosaka et al. |
| 4,910,385 A | 3/1990 | Shye-Long |
| 4,977,306 A | 12/1990 | Kosaka et al. |
| 5,013,891 A | 5/1991 | Shoemaker |
| 5,411,237 A | 5/1995 | Dougherty |
| 5,490,336 A | 2/1996 | Smick et al. |
| 5,511,322 A | 4/1996 | Fertig |
| D372,189 S * | 7/1996 | Andis et al. ................. D8/373 |
| 5,590,475 A * | 1/1997 | Andis ............................ 34/97 |
| 5,784,800 A * | 7/1998 | Santhouse et al. ............ 34/97 |
| 5,857,263 A * | 1/1999 | Chan ............................. 34/97 |
| D412,219 S | 7/1999 | Goetschi |
| 6,026,590 A * | 2/2000 | Picozza et al. ................ 34/90 |
| D425,242 S | 5/2000 | Cheung |
| D425,665 S | 5/2000 | Kling et al. |
| D426,022 S | 5/2000 | Micinilio |
| D427,726 S * | 7/2000 | Cruz et al. ................... D28/73 |
| D436,690 S * | 1/2001 | Cruz et al. ................... D28/13 |

OTHER PUBLICATIONS

Front and rear covers and p. 220 of "Best General Merchandise Catalog 1990/1991".
Front and rear covers and p. 288 of Service Merchandise "1996/1997 Jewelry Gift and Home Catalog".
One page photocopy of three photographs dated May 15, 1998 of Conair 1600 hair dryer and mounting bracket admitted to be prior art.
Front cover and p. 567 of 94/95 Government Supply Catalog publishy in 1994 by American Hotel Register Company.
Four page photocopy of Use and Care Instructions for Sunbeam Wall Mount 1500 Watt Hair Dryer Model 1626–40 published 1998 by Sunbeam Corp.

* cited by examiner

Primary Examiner—Stephen Gravini
(74) Attorney, Agent, or Firm—Roger S. Dybvig

(57) ABSTRACT

A portable electric hair dryer has a power switch which is automatically switched off as the hair dryer is mounted on a wall mount. The wall mount comprises a one-piece molded plastic body having integrally-molded clamping jaws for gripping the hair dryer handle. To deter theft, provision is made for storing and retaining intermediate lengths for the hair dryer's power cord behind the wall mount.

16 Claims, 3 Drawing Sheets

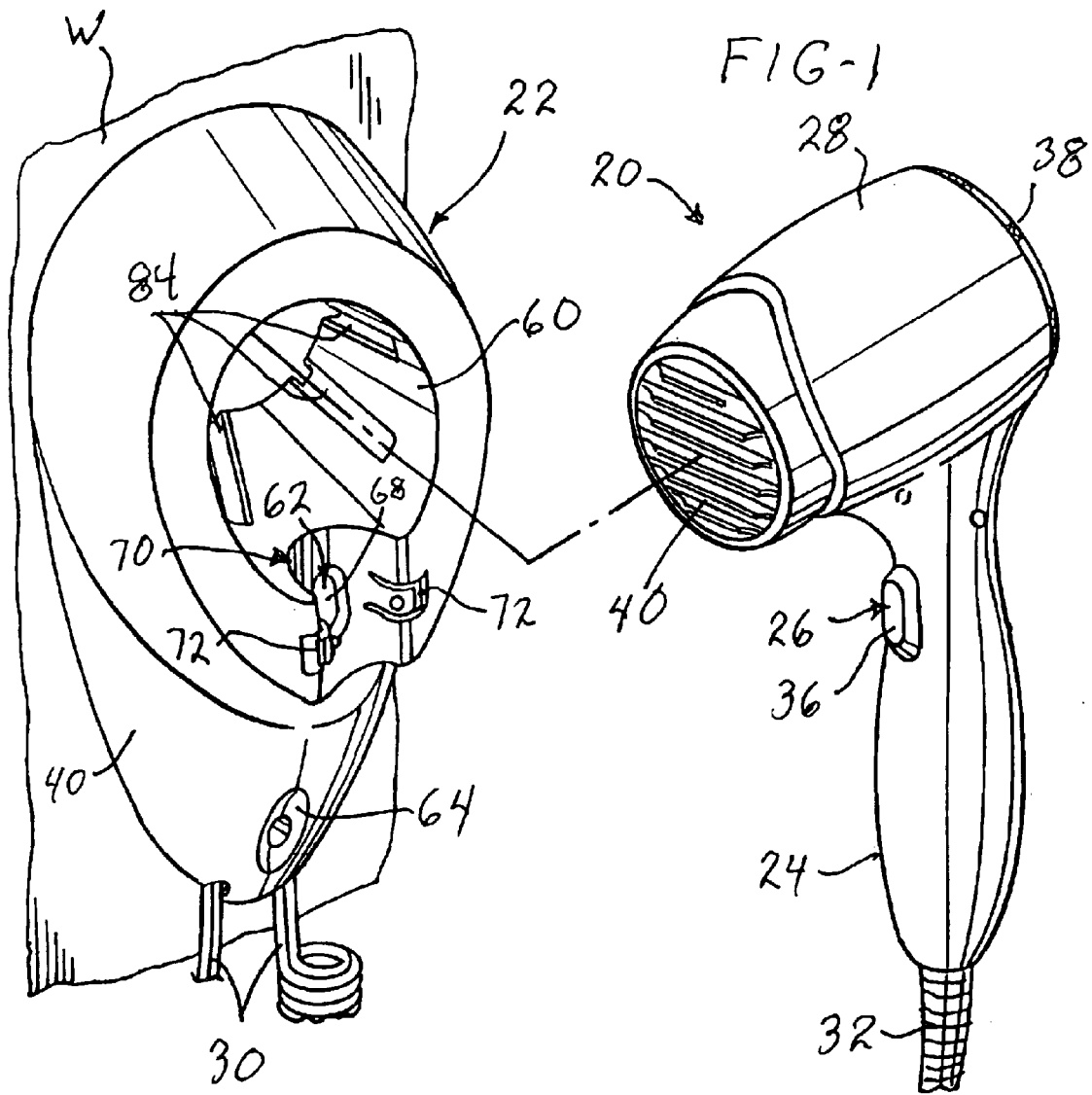

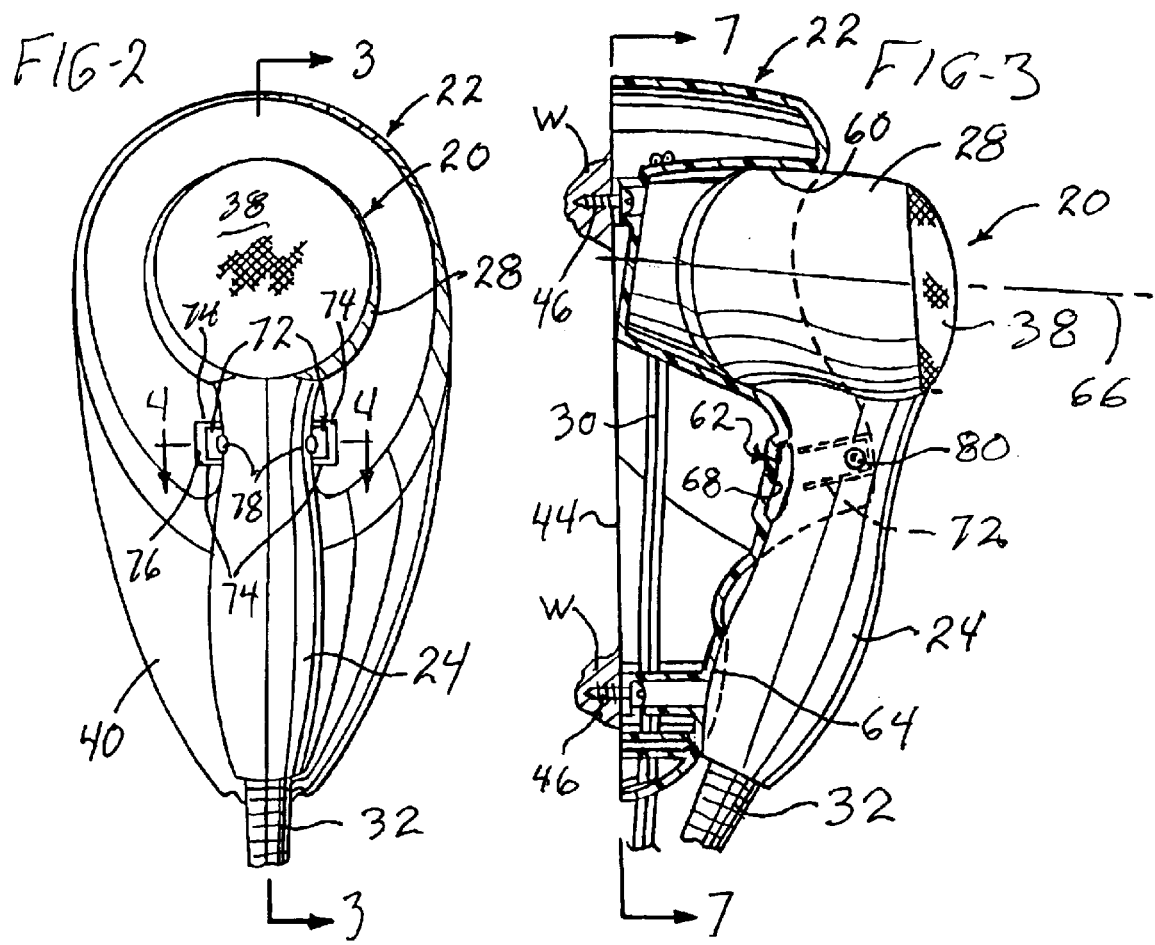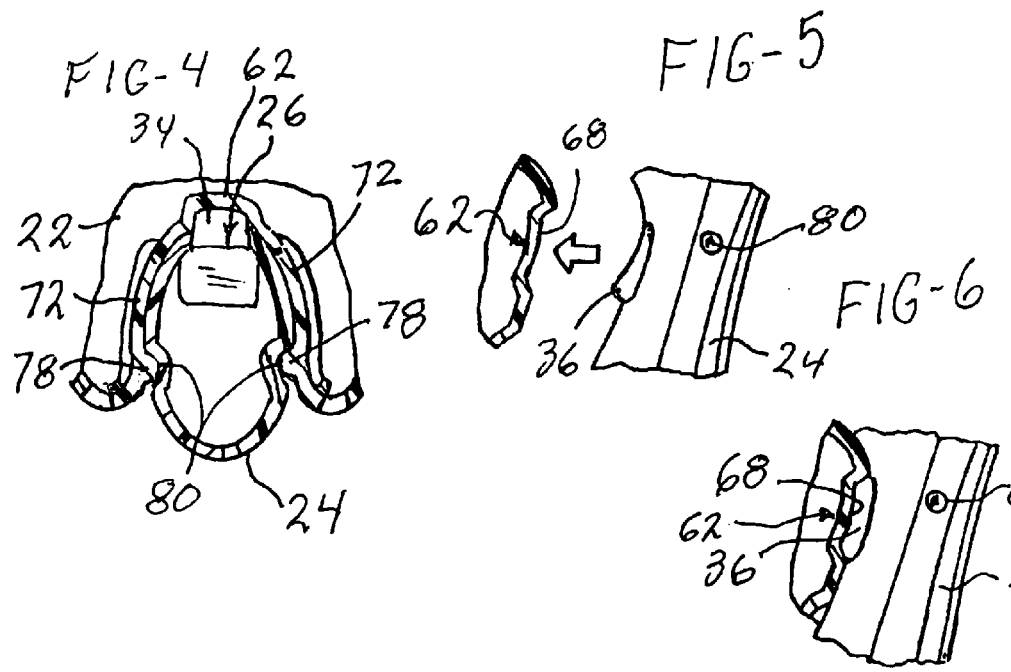

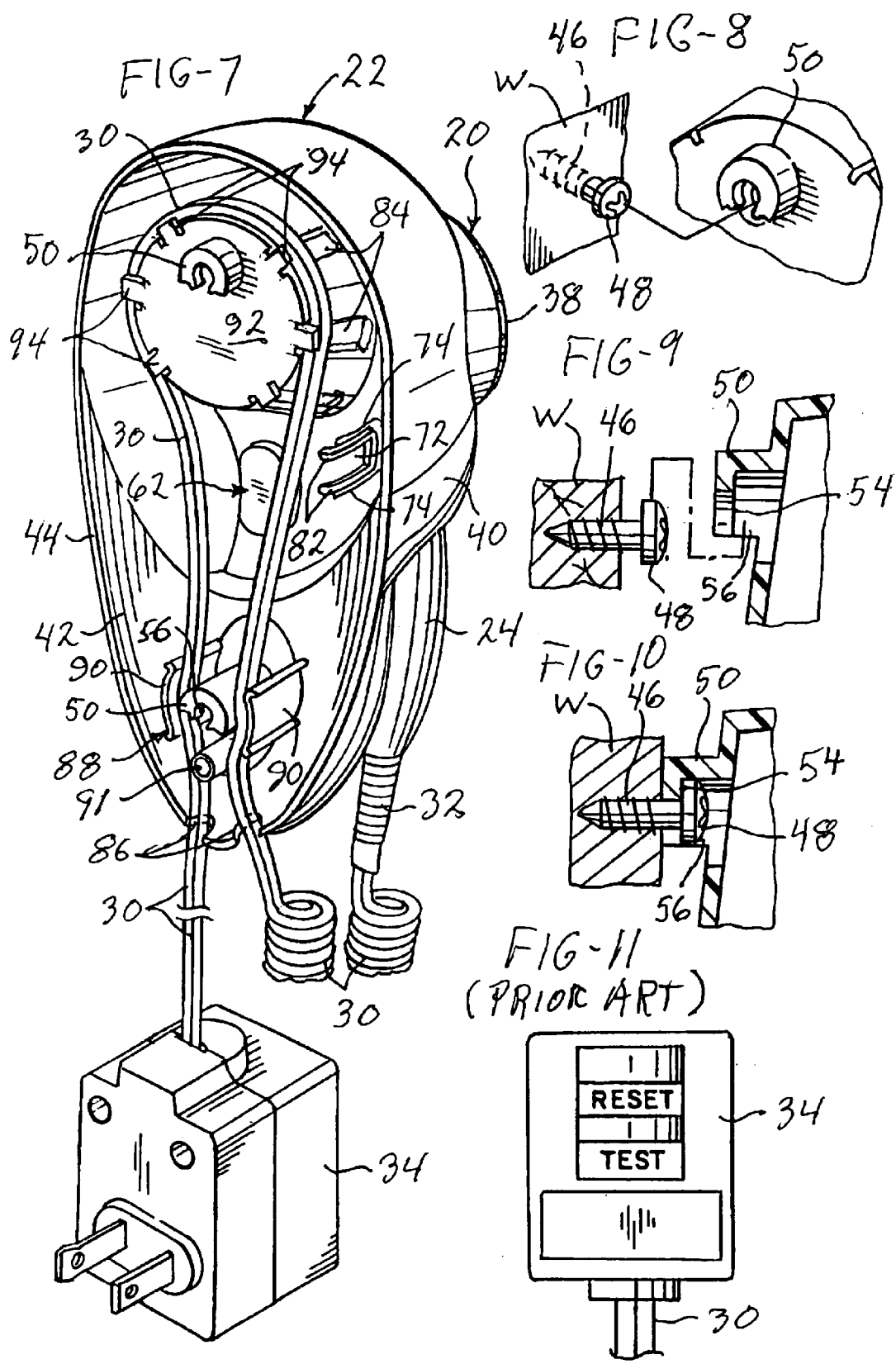

PORTABLE ELECTRIC HAIR DRYER AND MOUNT THEREFOR

FIELD OF THE INVENTION

This invention is directed to a portable electric hair dryer and a mount therefor. However, aspects of this invention may be used for other appliances and mounts therefor. The invention is primarily intended for use in mounting a portable hair dryer on a vertical wall but it is recognized that wall mounts can also be used for mounting hair dryers on horizontal or sloping surfaces, and this invention may similarly be used.

BACKGROUND OF THE INVENTION

Various wall mounted, portable hair dryers have been proposed and marketed. These often are provided with an arrangement for ensuring that the hair dryer is switched off when the hair dryer is placed on the wall mount. The known prior art hair dryers have wall mounts with relatively complex means for supporting the hair dryers or relatively complex means for turning the hair dryers off when placed on their wall mounts.

The hair dryer and wall mount of this invention are designed for commercial use such as in hotel and motel rooms or other places available to the public. Thefts of hair dryers from hotels and motels have become a problem that needs to be better addressed.

SUMMARY OF THE INVENTION

An object of this invention is to provide an improved, portable, electrically-operated hair dryer and a wall mount therefor so constructed that the hair dryer can be easily and securely assembled onto the wall mount, easily removed from the wall mount, and reliably switched off as the hair dryer is assembled onto the wall mount in the event an attempt is made to assemble the appliance onto the wall mount while it is switched on.

Another object of this invention is to provide an improved wall mount for a portable hair dryer that has a power cord that can store either short or long lengths of the power cord out of sight.

Another object of this invention is to provide a hair dryer and wall mount with features that deter theft of the hair dryer from places, such as hotel and motel rooms, accessible to the public.

A portable electric hair dryer in accordance with this invention has a power switch which is automatically switched off as the hair dryer is mounted on a wall mount. The wall mount comprises a one-piece molded plastic body having integrally-molded clamping jaws for gripping the hair dryer handle. The hair dryer is assembled onto the wall mount by simply thrusting the hair dryer toward the wall mount to bring cooperating protuberances and recesses on the wall mount and the hair dryer handle into mutual engagement.

To deter theft, provision is made for storing and retaining intermediate lengths of the hair dryer's power cord around a reel located behind the wall mount and for preventing one from pulling the power cord out from behind the wall mount. Accordingly, one attempting to steal the hair dryer would either have to remove the wall mount from the wall or cut the power cord, which would render the hair dryer less valuable.

BRIEF DESCRIPTION OF THE DRAWINGS

FIG. 1 is a fragmentary, exploded perspective view of a hair dryer and a wall mount therefor in accordance with this invention, as viewed generally from the front of the wall mount.

FIG. 2 is a fragmentary, front elevational view of the hair dryer and the wall mount of FIG. 1.

FIG. 3 is a fragmentary, cross-sectional view of the hair dryer and the wall mount, taken along line 3—3 of FIG. 2.

FIG. 4 is a simplified, fragmentary, cross-sectional view of the hair dryer and the wall mount taken on line 4—4 of FIG. 3, and illustrating a power switch within the handle of the hair dryer.

FIG. 5 is an exploded, fragmentary view, with parts in cross section illustrating the hair dryer power switch approaching the wall mount with the switch in an "on" position so that the hair dryer is energized.

FIG. 6 is a fragmentary view, with parts in cross section illustrating the hair dryer power switch engaged with the wall mount and in an "off" position so that the hair dryer is deenergized.

FIG. 7 is a fragmentary, exploded perspective view of the hair dryer and the wall mount, as viewed generally from the rear of the wall mount.

FIG. 8 is an exploded, fragmentary, perspective view illustrating a mounting screw in a wall on which the wall mount may be mounted and a screw socket provided on the wall mount that receives the head of the mounting screw.

FIG. 9 is an exploded, fragmentary, cross-sectional view of the parts illustrated in FIG. 8.

FIG. 10 is a fragmentary, cross-sectional view of the parts illustrated in FIGS. 8 and 9 when such parts are assembled together.

FIG. 11 is a fragmentary elevational view showing an electrical outlet plug of a type useful with the hair dryer and wall mount of this invention.

DETAILED DESCRIPTION

With reference to FIGS. 1 through 4, this invention provides an assembly of a portable electric hair dryer, generally designated 20, and a wall mount therefor, generally designated 22, shown mounted on a vertical wall W. The hair dryer 20 has an elongate, hollow handle 24 and a power switch 26 (FIG. 4) mounted on the handle 24 for controlling the operation of a blower motor (not shown) mounted within a tubular blower housing 28 located on top of the handle 24. A power cord 30 for connection of the hair dryer 20 to a source of house current extends upwardly through the handle 24 and out through the bottom of the handle 24 and downwardly through a cord guard 32 that depends from the handle 24. Here it may be noted that FIG. 4 is simplified because FIG. 4 shows the switch 26 without showing how the switch 26 is mounted and FIG. 4 does not show the power cord 30 or other details of construction, all of which may be entirely conventional. As shown in FIGS. 7 and 11, the free end of the power cord 30 is preferably provided with a commercially available polarized Appliance Leakage Circuit Interrupter (ALCI) outlet plug 34.

With reference also to FIGS. 5 and 6, the switch 26 includes a movable switch-operating member or button 36 which can be manually moved into a position to open the switch 26 to deenergize the hair dryer 20. The particular switch 26 illustrated in the drawing is a common type of three position switch used in hair dryers. The hair dryer is switched off when the button 36 is centered with the entire button 36 extending equally partly out of the handle 24, as shown in FIGS. 1, 3 and 6, switched to a low speed "on" position illustrated in FIG. 5, when the switch button 36 is tilted so that its upper end extends further into the handle 24 than its lower end, and switched to a high speed "on"

position (not illustrated) when the lower end of the button 36 is recessed further into the handle 24 than its upper end. Although a switch having a three-position switch operating button is illustrated, it will become apparent that other types of switches can be used in the practice of this invention, provided that there is a switch operating member that can be moved to a position in which the switch is opened or switched off by engagement of the switch operating member with the wall mount 22.

The blower housing 28 has a rear end covered by a cool air intake screen 38 and a front end covered by a front screen or guard 39 through which heated air exits during operation of the hair dryer 20. In accordance with this invention, the switch operating member or button 36 is mounted on the front face of the handle 24, facing generally toward the same forwardly direction as the front end of the blower housing 28. The handle 24 and the blower housing 28 can be manufactured from a suitable plastic material, such as a polycarbonate, and molded in two parts that are later joined together along a vertical centerline of the handle 24.

The wall mount 22 comprises a relatively rigid, one-piece, molded plastic body, which may be molded from an ABS or other suitable plastic material, and having a front face 40 and a rear face 42. The wall mount 22 is generally ovate as seen from the front or the rear, and has a rearwardly-facing outer edge 44 that lies in a single plane so that it can fit flush against the vertical wall W. As shown in FIGS. 3 and 8 through 10, the wall mount 22 may be affixed to the wall W by means of a pair of mounting screws 46 which have heads 48 received, respectively, in upper and lower screw-receiving tubes 50. The tubes 50 are open to the front face 40 of the wall mount 22 so that the screws 46 can be engaged by a screw driver (not shown) extended through the tubes from the front. In addition, the screw-receiving tubes 50 have rear walls 54 against which the screw heads 48 bear when the wall mount 22 is supported on the wall W. In addition, the tubes 50 have downwardly-facing openings 56 that permit the tubes 50, and thereby the wall mount 22 to be lifted off the screw heads 48 without removing the screws 46. This construction enables speedy removal of the wall mount 22 from a wall in the event of an emergency, such as a fire behind the wall mount 22. The opening 56 in the upper tube 50 faces straight downwardly whereas the opening 56 in the lower tube 50 faces partly to one side (to the left as viewed in FIG. 7). Because of this construction, someone familiar with the construction of the dryer mount 22 will be able to remove the mount by pushing the lower end of the mount to the side to align the lower opening 56 with the head of the lower screw 46 and then by moving the entire wall mount 22 upwardly away from both screws 46. This provides a deterrent to theft while enabling a knowledgeable person, such as a motel maintenance employee, to quickly remove the wall mount 22 should that become necessary.

When viewed in vertical cross section, as illustrated in FIG. 3, the wall mount 22 is generally domed-shaped but its front face 40 is recessed to form a socket 60 for the front end of the blower housing 28, a recessed pocket 62 for the switch button 36, and a shallow, concave recess 64 which provides a stop or rest for the lower end of the dryer handle 24. As best shown in FIG. 3, the blower housing-receiving socket 60 has a center axis 66 to that slopes forwardly away from the wall W and downwardly so that the hair dryer 20 would tend to fall off the wall mount 22 under the influence of gravity unless means are provided to positively secure the hair dryer 20 to the wall mount 22.

In the embodiment illustrated in the drawings, the switch button-receiving pocket 62 has a size and shape that substantially matches the size and shape of the exposed portion of the switch button 36 when the switch button 36 is in the "off" position. The bottom wall, designated 68, of the pocket 62 functions as a switch operating surface to move the switch button 36 to its "off" position as the hair dryer 20 is assembled onto the wall mount 22. To this end, as illustrated in FIGS. 1, 5 and 6, the switch operating surface 68 has an arcuately convex surface portion that mates with switch button 36, which is arcuately concave. Accordingly, if the switch button 36 happens to be in one of its switch-closed or "on" positions, as shown in FIG. 5, the engagement of the switch button 36 by the switch-operating surface 68 as the hair dryer 20 is assembled onto the wall mount 22 will cause the switch button 36 to be moved to its centered or "off" position shown in FIG. 6.

As best shown in FIG. 1, the switch button-receiving pocket 62 is located within a handle-receiving channel 70 that extends downwardly from the blower-housing receiving socket 60 along the vertical centerline of the wall mount 22. To positively secure the hair dryer 20 to the wall mount 22, a pair of mutually-confronting, outwardly-extending, rectangular, mutually-spaced clamp jaws 72 project forwardly along the sides of the channel 70. The jaws 72 are an integral part of the wall mount 22; otherwise they are separated from the body of the wall mount 22 by U-shaped slots having, as viewed in FIG. 1, upper and lower horizontal slot portions 74 and forwardly-facing, vertical slot portions 76. Small clamping protuberances 78 are formed on the confronting, outer faces of the jaws 72 that are adapted to be received within small clamping recesses 80 in the handle 24. As shown best in FIGS. 3 and 4, the handle 24 is generally ovate and the recesses 80 are located on the rearward side of the handle 24. The clamping recesses 80 are spaced from the base of the channel 70 by a distance such that their forward-most edges are engaged by rearward edges of the clamping protuberances 78 and biased thereby toward the front face 40 of the wall mount 22. The hair dryer 20 is thereby securely held against the wall mount 22 and the switch 26 assuredly switched off.

As viewed in FIG. 7, the free ends and sides of the clamp jaws 72 are provided with stiffening ribs 82 extending therealong, the side ribs being integrally connected to surrounding parts of the wall mount 22. This construction provides clamp jaws 72 which are quite stiff, long lasting, yet sufficiently resilient to enable the hair dryer 20 to be easily assembled onto and removed from the wall mount 22.

To use the hair dryer 20, one may simply grasp the handle and pull it away from the wall mount 22, and switch the hair dryer 20 to one of its "on" positions. To return the hair dryer to the wall mount 22, one may simply point the front end of the hair dryer toward the wall mount 22, and insert the front end of the blower housing 28 into the blower housing-receiving socket 60. If the handle 24 is advanced toward the wall mount 22 along a substantially vertical plane, it will be guided by the surfaces of the wall mount 22 opening to the blower housing-receiving socket 60 and the handle-receiving channel 70 into a position wherein the protuberances 78 on the clamp jaws 72 enter the clamping recesses 80. Provided the protuberances 78 enter the recesses 80, the switch button 36, if not previously moved to its "off" position, will be moved to its "off" position because of the engagement by the switch button 36 with the switch operating surface 68. One using the hair dryer 20 and the wall mount 22 will quickly learn that the hair dryer 20 can be securely mounted with a simple thrusting of the hair dryer 20 toward the center of the wall mount. If the hair dryer 20 is switched on while being advanced toward the wall mount 22, the heated air exiting from the front of the blower housing 28 will enter the socket 60 and be partly reflected back around the blower housing 28 and partly vented through an array of vents 84 in the wall of the socket 60.

In the event the handle 24 is not properly gripped by the clamp jaws 72 in the manner just described, the switch 26 may not be switched off. However, the wall mount 22 will not in that case prevent the hair dryer 20 from falling off the wall mount 22 so that it will be evident to the user that the hair dryer 20 has to be repositioned on the wall mount 22.

Here it may be observed that the locations of the protuberances 78 and the recesses 80 illustrated herein and described above are preferred. However, their positions could be interchanged, with the handle 24 provided with protuberances and the clamp jaws 72 provided with recesses for receiving the protuberances.

With reference to FIG. 7, an intermediate portion of the power cord 30 is hidden behind the wall mount 22. A pair of cord-receiving-notches 86 are located at the bottom of the wall mount 22 through which the power cord 30 can be threaded. A strain relief, generally designated 88, is provided that also frictionally engages the power cord 30 in two places. The strain relief 88 includes the aforementioned lower screw-receiving tube 50 and a pair of arcuate pressure plates 90 located sufficiently close to the lower tube 50 to resist sliding movement of the power cord 30 between the lower tube 50 and the pressure plates 90. A post 91 is located beneath the lower tube 50 for additional strain relief should that be desired. In addition, the back side of the socket 60 functions as a reel or cord wrap 92 for taking up excessive lengths of the power cord 30 between the location of the wall mount 22 and the electrical receptacle (not shown) into which the plug 34 is inserted. A circular array of outwardly projecting flanges or teeth 94 at the base of the reel 92 help retain the power cord 30 on the reel 92. In FIG. 7, the power cord 30 is shown simply wrapped over the top of the reel 92. In practice, there could be one or more turns of the power cord 30 coiled about the reel 92. In any event, when the power cord 30 is wrapped over the reel 92, it is essentially impossible to pull the power cord 30 out from behind the back of the wall mount 22.

Although the presently preferred embodiment of this invention has been described, it will be understood that within the purview of the invention various changes may be made within the scope of the following claims.

Having thus described my invention, I claim:

1. A portable electric appliance and wall mount therefor comprising:
   a portable electric appliance having an elongate handle, a housing on top of said handle that contains working parts of said appliance, said housing having a front and said handle having a front portion facing generally the same direction as the front of said housing, and a power switch mounted on said handle, said power switch including an operating member on said front portion of said handle which can be manually moved into a position to open said switch to deenergize the appliance; and
   a wall mount comprising a one-piece, molded plastic body having a front face and a rear face, said front face of said wall mount being recessed to provide a socket for receiving said housing, said front face having a switch-engaging surface portion facing outwardly from said front face toward said front portion of said handle and adapted to engage said switch operating member to open said switch as said appliance is assembled onto said wall mount in the event an attempt is made to assemble said appliance on said wall mount when said power switch is closed and said appliance is, therefore, energized, whereupon said appliance may be removed from said wall mount by one grasping said handle and pulling said appliance away from said wall mount and returned to said wall mount by pointing and moving the front of said appliance toward and into engagement with said wall mount with assurance that said switch will be closed if opened while said appliance is being returned to said wall mount.

2. A portable electric appliance and wall mount therefor comprising:
   a portable electric appliance having an elongate handle and a power switch mounted on said handle, said power switch including an operating member which can be manually moved into a position to open said switch to deenergize the appliance; and
   a wall mount comprising a one-piece, molded plastic body having a front face and a rear face, said front face having a switch-engaging surface portion adapted to engage said switch operating member to open said switch as said appliance is assembled onto said wall mount in the event an attempt is made to assemble said appliance on said wall mount when said power switch is closed and said appliance is, therefore, energized,
   said body comprising a pair of outwardly-extending, mutually-spaced clamp jaws partly separated from surrounding parts of said body, said appliance handle and said clamp jaws having cooperating projections and recesses, said clamp jaws being adapted to clamp said appliance handle therebetween with said switch operating member pressed against said front face of said wall mount when said projections enter said recesses.

3. The appliance and wall mount of claim 2 wherein said recesses are located in said handle and one of said projections extends from one of said clamp jaws and the other of said projections extends from the other of said clamp jaws, said projections facing substantially toward one another.

4. The appliance and wall mount of claim 3 wherein said projections and said recesses are so located relative to said switch operating member that, as the appliance is advanced toward said wall mount, said projections resiliently cam against the leading edges of said recesses, pulling said handle toward said wall mount so that said switch operating member is pressed against the front wall of said wall mount.

5. The appliance of claim 4 wherein said appliance includes a housing on top of said handle that contains working parts of said appliance and wherein said front face of said wall mount is recessed to provide a socket for receiving said housing.

6. The appliance and wall mount of claim 1 wherein a power cord extends outwardly from said handle.

7. A portable electric appliance and wall mount therefor comprising:
   a portable electric appliance having an elongate handle, a power cord extending outwardly from said handle, and a tower switch mounted on said handle, said power switch including an operating member which can be manually moved into a position to open said switch to deenergize the appliance; and
   a wall mount comprising a one-piece, molded plastic body having a front face and a rear face, said front face having a switch-engaging surface portion adapted to engage said switch operating member to open said switch as said appliance is assembled onto said wall mount in the event an attempt is made to assemble said appliance on said wall mount when said power switch is closed and said appliance is, therefore, energized, wherein said wall mount has slots at its lower end for receiving sections of said power cord so that at least part of said power cord is housed behind the front face of said wall mount, and wherein said socket has a back surface that forms a reel about which said power cord may be coursed.

8. The appliance and wall mount of claim 1 wherein said appliance is a portable, hand-held hair dryer.

9. The appliance and wall mount of claim 2 wherein said appliance is a portable, hand-held hair dryer.

10. The appliance and wall mount of claim 9 wherein said recesses are located in said handle and one of said projections extends from one of said clamp jaws and the other of said projections extends from the other of said clamp jaws, said projections facing substantially toward one another.

11. The appliance and wall mount of claim 10 wherein said projections and said recesses are so located relative to said switch operating member that, as the appliance is advanced toward said wall mount, said projections resiliently cam against the leading edges of said recesses, pulling said handle toward said wall mount so that said switch operating member is pressed against the front wall of said wall mount.

12. A portable electric appliance and wall mount therefor comprising:

a portable electric appliance comprising a portable, hand-held hair dryer having an elongate handle and a power switch mounted on said handle, said power switch including an operating member which can be manually moved into a position to open said switch to deenergize the appliance; and a wall mount comprising a one-piece, molded plastic body having a front face and a rear face, said front face having a switch-engaging surface portion adapted to engage said switch operating member to open said switch as said appliance is assembled onto said wall mount in the event an attempt is made to assemble said appliance on said wall mount when said power switch is closed and said appliance is, therefore, energized, wherein said appliance includes a housing on top of said handle that contains working parts of said appliance and wherein said front face of said wall mount is recessed to provide a socket for receiving said housing.

13. The appliance and wall mount of claim 8 wherein a power cord extends outwardly from said handle.

14. The appliance and wall mount of claim 7 wherein said appliance is a portable, hand-held hair dryer.

15. The appliance and wall mount of claim 8 wherein said hair dryer has a blower and heater housing on top of said handle, said housing having an air intake at its rear end and an air outlet at its front end, and wherein said switch operating member is located on the front end of said handle and projects forwardly therefrom.

16. The appliance and wall mount of claim 15 wherein said wall mount has a recess in its front wall forming a cavity for receiving the front portion of said blower and heater housing.

* * * * *